US009081867B2

(12) United States Patent
Ahmed et al.

(10) Patent No.: US 9,081,867 B2
(45) Date of Patent: *Jul. 14, 2015

(54) SYSTEM AND METHOD TO TRANSFORM RESULTS OF CLIENT REQUESTS USING CLIENT UPLOADED PRESENTATION FORMATS

(75) Inventors: Zahid N. Ahmed, San Jose, CA (US); Bhaven Avalani, Cupertino, CA (US); Changyi Zhu, San Jose, CA (US); Sergei Nikolaev, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/435,652

(22) Filed: Mar. 30, 2012

(65) Prior Publication Data

US 2012/0192062 A1   Jul. 26, 2012

Related U.S. Application Data

(63) Continuation of application No. 11/216,790, filed on Aug. 31, 2005, now Pat. No. 8,150,847.

(51) Int. Cl.
G06F 17/30 (2006.01)

(52) U.S. Cl.
CPC ................. *G06F 17/30893* (2013.01)

(58) Field of Classification Search
None
See application file for complete search history.

(56) References Cited

U.S. PATENT DOCUMENTS

| | | | |
|---|---|---|---|
| 6,741,989 B1 | 5/2004 | Seltzer et al. | |
| 6,760,731 B2 | 7/2004 | Huff | |
| 6,816,879 B1 | 11/2004 | Kiritzov et al. | |
| 7,028,028 B1 | 4/2006 | Balmin et al. | |
| 7,028,223 B1* | 4/2006 | Kolawa et al. | 714/38.14 |
| 7,136,846 B2 | 11/2006 | Chang et al. | |
| 7,162,433 B1 | 1/2007 | Foroutan | |
| 7,213,202 B1 | 5/2007 | Kagle | |
| 8,150,847 B2 | 4/2012 | Ahmed et al. | |
| 2002/0107913 A1 | 8/2002 | Rivera et al. | |
| 2002/0116418 A1 | 8/2002 | Lachhwani et al. | |
| 2002/0165881 A1* | 11/2002 | Shelton | 707/526 |
| 2003/0023635 A1 | 1/2003 | Justice | |
| 2003/0084405 A1 | 5/2003 | Ito et al. | |
| 2004/0215719 A1* | 10/2004 | Altshuler | 709/204 |
| 2004/0216043 A1 | 10/2004 | Roudot | |
| 2005/0160070 A1 | 7/2005 | Mashni et al. | |
| 2005/0203939 A1 | 9/2005 | Kartzmark et al. | |
| 2005/0234856 A1 | 10/2005 | Baumhof et al. | |
| 2005/0262115 A1 | 11/2005 | Hu et al. | |
| 2005/0268216 A1 | 12/2005 | Hayes et al. | |

(Continued)

OTHER PUBLICATIONS

"U.S. Appl. No. 11/216,790, Advisory Action mailed Jul. 18, 2008", 11 pgs.

(Continued)

*Primary Examiner* — Jay Morrison
(74) *Attorney, Agent, or Firm* — Schwegman Lundberg & Woessner, P.A.

(57) ABSTRACT

Method and apparatus to facilitate access to a network-based publication system. In an embodiment, a user or third party affiliate of a network-based publication system uploads a style sheet or other presentation format file to a database in the network-based publication system. Thereafter, the user or third party affiliate sends a request to the network-based publication system, and the publication system uses one or more of the uploaded style sheets to format the response to be transmitted back to the third party affiliate.

35 Claims, 15 Drawing Sheets

(56) References Cited

U.S. PATENT DOCUMENTS

| | | |
|---|---|---|
| 2005/0278619 A1 | 12/2005 | Kim et al. |
| 2006/0206808 A1 | 9/2006 | Jasthi et al. |
| 2006/0288269 A1 | 12/2006 | Oppenlander et al. |
| 2007/0050373 A1 | 3/2007 | Ahmed et al. |

OTHER PUBLICATIONS

"U.S. Appl. No. 11/216,790, Final Office Action mailed May 1, 2008", 25 pgs.

"U.S. Appl. No. 11/216,790, Non Final Office Action mailed Oct. 10, 2007", 22 pgs.

"U.S. Appl. No. 11/216,790, Notice of Allowance mailed Nov. 28, 2011", 13 pgs.

"U.S. Appl. No. 11/216,790, Pre-Appeal Brief Request mailed Jul. 31, 2008", 4 pgs.

"U.S. Appl. No. 11/216,790, Response filed Jan. 3, 2008 to Non-Final Office Action mailed Oct. 10, 2007", 13 pgs.

"U.S. Appl. No. 11/216,790, Response filed Jul. 1, 2008 to Final Office Action mailed May 1 2008", 12 pgs.

\* cited by examiner

| LOCATIONS TABLE | | | | | | | | | | | | |
|---|---|---|---|---|---|---|---|---|---|---|---|---|
| ZIP CODE | CITY | STATE | COUNTY NAME | COUNTY CODE | COUNTRY | AREA CODE | TIME ZONE | DAYLIGHT SAVINGS TIME FLAG | LATITUDE | LONGITUDE | CITY FLAG | SOURCE |
| 80 | 82 | 84 | 86 | 88 | 90 | 92 | 94 | 95 | 96 | 97 | 98 | 99 |

*FIG. 5*

APPLICATION LIST

YOU CURRENTLY HAVE 3 APPLICATIONS.

INSTRUCTIONS:
SELECT AN APPLICATION AND CLICK NEXT TO LIST ITS UPLOADED XSL FILES.

STATUS: DISPLAY APPLICATIONS.

[ GO BACK ]   [ NEXT ]

| APPLICATION NAME | APPLICATION STATUS |
|---|---|
| ☐ ADMINAPP | ACTIVE |
| ☐ MSALERTS | ACTIVE |
| ☐ FILEEXCHANGE | ACTIVE |

805

[ GO BACK ]   [ NEXT ]

STATUS: DISPLAY APPLICATIONS.

APPLICATION: ADMINAPP

YOU CURRENTLY HAS 5 XSL FILES UPLOADED.

INSTRUCTIONS:
CLICK ON A FILE TAP TO TO VIEW OR RENAME IT.
TO DELETE FILES, CHECK THE APPROPRIATE BOXES AND CLICK ON THE DELETE.

[UPLOAD NEW FILE]

STATUS: DISPLAY XSL FILES.

[GO BACK]  [DELETE]

| FILE TAG | FILE NAME | UPLOAD TIME | ACTIVE? — 819 |
|---|---|---|---|
| ☐ FILETAG100 — 816 | COPY.XSL — 818 | 1/1/0001 12:00:00AM — 817 | |
| ☐ COPY103 | COPY.XSL | 1/1/0001 12:00:00AM | |
| ☐ FOO2 | FOO2.XSL | 1/1/0001 12:00:00AM | |
| ☐ ID2(TAP) | | 1/1/0001 12:00:00AM | |
| ☐ TOTAL101 | TOTAL.XSL | 1/1/0001 12:00:00AM | |

{ 815

[GO BACK]  [DELETE]

STATUS: DISPLAY XSL FILES.

APPLICATION: ADMINAPP

UPLOAD A NEW FILE

INSTRUCTIONS:
TO UPLOAD A NEW XSL FILE, FIND THE FILE USING THE BROWSE BUTTON, ENTER A FILE TAG AND CLICK UPLOAD. FILE EXTENSION .XSL IS REQUIRED. YOU CAN USE ANY FILE TAG THAT YOU HAVE NOT PREVIOUSLY USED. THE DEFAULT FILE TAG IS THE NAME OF THE FILE WITHOUT ITS EXTENSION.

FILE TAG [          ]　　　FILE TAG [          ] [BROWSE]

[UPLOAD] [CANCEL]

APPLICATION: ADMINAPP

RENAME FILE

INSTRUCTIONS:
IN THE FORM BELOW, TYPE THE NEW TAG FOR THE FILE AND CLICK THE RENAME BUTTON.
CLICK CANCEL TO GO BACK TO VIEW XSL FILE PAGE

CURRENT TAG: F002

NEW TAG:

[ RENAME ]   [ CANCEL ]

*FIG. 8E*

SYSTEM AND METHOD TO TRANSFORM RESULTS OF CLIENT REQUESTS USING CLIENT UPLOADED PRESENTATION FORMATS

CROSS-REFERENCE TO RELATED APPLICATION

The present application claims priority to U.S. Non Provisional patent application Ser. No. 11/216,790 filed, Aug. 31, 2005, the content of which is incorporated herein by reference in its entirety.

TECHNICAL FIELD

The present application relates generally to the field of network communications and, in an example embodiment, but not by way of limitation, to communications between portals and other service providers in a network.

BACKGROUND

Some of the advantages offered by a typical network-based publication system (e.g., a website) are the simplicity, promptness and convenience of participating in the online information publishing and viewing process.

However, since website development can be very expensive, and many businesses cannot easily develop their own websites, many businesses have expanded into the online arena by associating themselves with the services provided by online service providers. Consequently, instead of developing their own websites, these businesses have developed third-party applications that interact with network-based systems. These third party applications may enhance the user experience for users of the network-based publication system by providing programs that the network-based publication system does not have. Regarding the enhancement of the user experience for a user of a particular business's systems, these third party applications may integrate the applications of that particular business entity with a particular popular network-based publication system and extend platforms of that business entity into new business areas.

Additionally, these third-party application programs may be extremely valuable for users who conduct a great many business transactions using the network-based publication system, and users who would like to have the information presented to attract buyers in a way that may be different from the network-based publication system. Moreover, businesses who use these third party application programs may have items listed for trading on the network-based publication system, but may wish to have the users interact with the network-based publication system through the business's Website using such third party applications. Thus, such third party applications may expand a business's services to its clients.

FIG. 1 illustrates an example of a typical networked system in which a user is able to invoke a third party application in conjunction with accessing a network-based publication system. Specifically, FIG. 1 illustrates a network-based publication system 100 (e.g., an online publication system). In the system 100, a user 110 is able to access and communicate with a network-based publication system 115 through a network 108 such as the Internet. The network-based publication system 115 includes a user interface 106, an application engine 104, and a database 102. The user interface 106 contains application programs that accept requests from the users. In connection with a user 110 accessing a network-based publication system, the user 110 may invoke one of its own applications 112, or the application 112 of another third party.

FIG. 1a illustrates a more detailed example of the manner in which a user 110 may invoke a third party application 112 in connection with accessing a network-based publication system 115. In FIG. 1a, the user 110 communicates with other entities in the system 100 by sending an eXtensible Markup Language (XML) request 120 over HyperText Transfer Protocol 122 (HTTP). The application engine 104 of the network-based publication system 115 executes the request 120 (e.g., retrieving particular items available in an auction), and returns the results to the user 110 through the network 108 also in an XML document over HTTP protocol. The user 110 may then transform the data in the XML document into an HTML document. In this manner, the user 110 can transform the relatively raw data in the XML format into an HTML document which will display the data with the particular look and feel that the user 110 wants to convey on its internal systems.

FIG. 1b illustrates another example of the manner in which a user 110 may access a network-based publication system 115 and use a third party application 112. In FIG. 1b, the user 110 may transfer a style sheet 124, such as an eXtensible Style Language style sheet, over HTTP protocol 122 to the network-based publication system 115. Alternatively, a user 110 may include a URL in the HTTP protocol based message sent to the network-based publication system, and the publication system can invoked the URL to access the style sheet. The transfer of this style sheet may be combined with a request to retrieve data from the network-based publication system 115. In addition to retrieving the data contained within the user's request, the network-based publication system 115 uses the style sheet 124 to create an HTML document 126. The network-based publication system 115 transmits the HTML document 126 to the user 110, who can then display the data in the format dictated by the HTML document.

These approaches to the use of third party applications in connection with a network-based publication system however present several problems to such users 110, especially smaller business entities that do not have the bandwidth, hardware, and/or personnel to implement such systems in connection with their internal systems and applications. In a system in which a network-based publication system transmits an XML document 120 to a user 110, the conversion of that XML document 120 to an HTML document 126 is not a trivial task. The user 110 must have available to it the bandwidth, servers (hardware and software), and personnel to accomplish such a conversion. Moreover, if there is a change in the creation of the XML document 120 on the network-based publication system 100, the code on the user's system that converts the XML document 120 into an HTML document 126 must also be changed.

Similarly, in systems in which a user transmits a style sheet to a network-based publication system, and thereafter receives an HTML document back from that facility, the network-based publication system has little control over such style sheets, and is therefore susceptible to error-ridden style sheets, or worse yet, style sheets that contain malicious code that can wreak havoc to a network-based publication system 115.

Network-based publication systems are therefore in need of an improved manner to respond to client requests and format responses to these requests.

SUMMARY OF THE INVENTION

An embodiment of the present invention discloses methods and apparatuses for transforming on a server the results of a client request using presentation formats that have been uploaded to the server by the client. In one embodiment, a client uploads presentation formats to a data base on a network-based publication system. Such presentation formats may include an eXtensible Style Language (XSL) file, Cascading Style Sheets (CSS), or some other presentation format/language. The protocol used by the client and server may be the Hyper Text Transfer Protocol (HTTP), and the request itself may be formatted in the eXtensible Markup Language (XML). The network-based publication system executes the client's request, and uses the client-uploaded presentation formats to generate a server-side transformation and response to the client's request. In an embodiment, that response is in a HyperText Markup Language (HTML) format, and that HTML document is transmitted to the client over HTTP protocol and displayed on the client's system.

BRIEF DESCRIPTION OF THE DRAWINGS

The present invention is illustrated by way of example and not limitation in the figures of the accompanying drawings, in which like references indicate similar elements and in which:

FIG. 5 illustrates an exemplary diagrammatic representation of one embodiment of a locations table within the database;

FIGS. 8A-8E illustrate a user interface to a network-based publication system through which a user can upload style sheets;

DETAILED DESCRIPTION

Methods and apparatuses for facilitating access to a network-based publication system such as, for example, an Internet-based, search engine, portal or commerce system (e.g., publication system), in conjunction with the use of third party applications, are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions, providing feedback, accessing e-mail, and the like.

Transaction Facility

Figure 1:
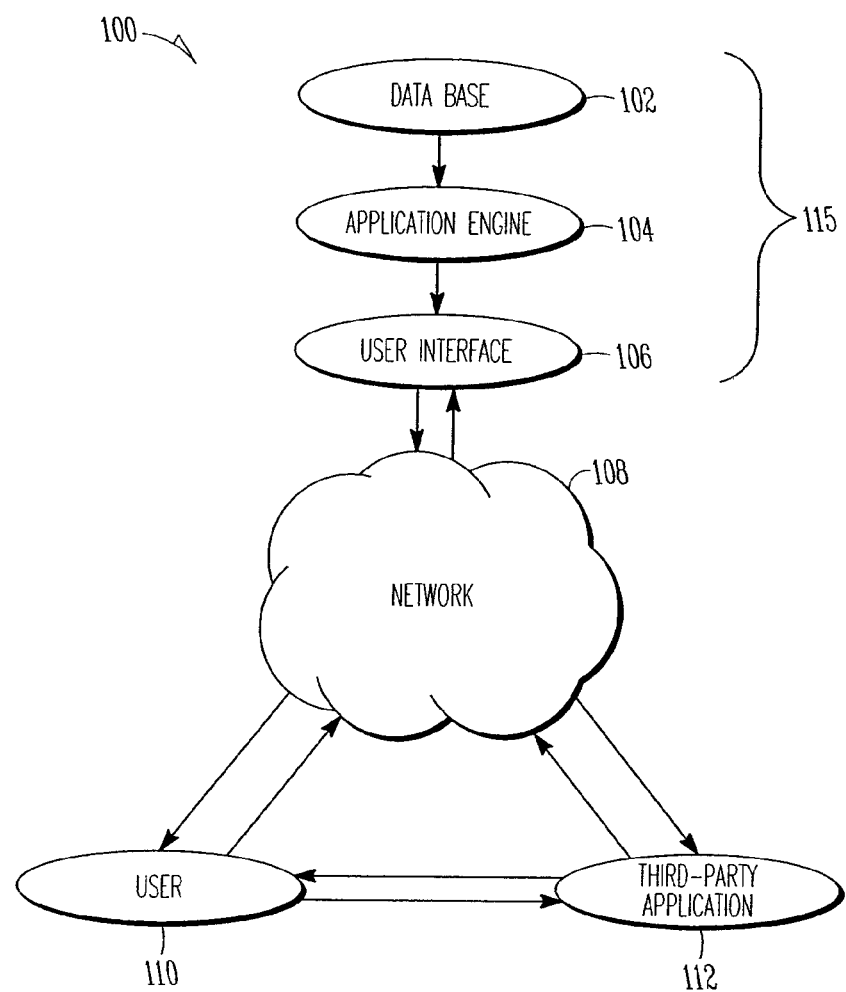
FIG. 1 is an exemplary prior art embodiment of a network-based publication system and a third-party application.
Figure 1A:
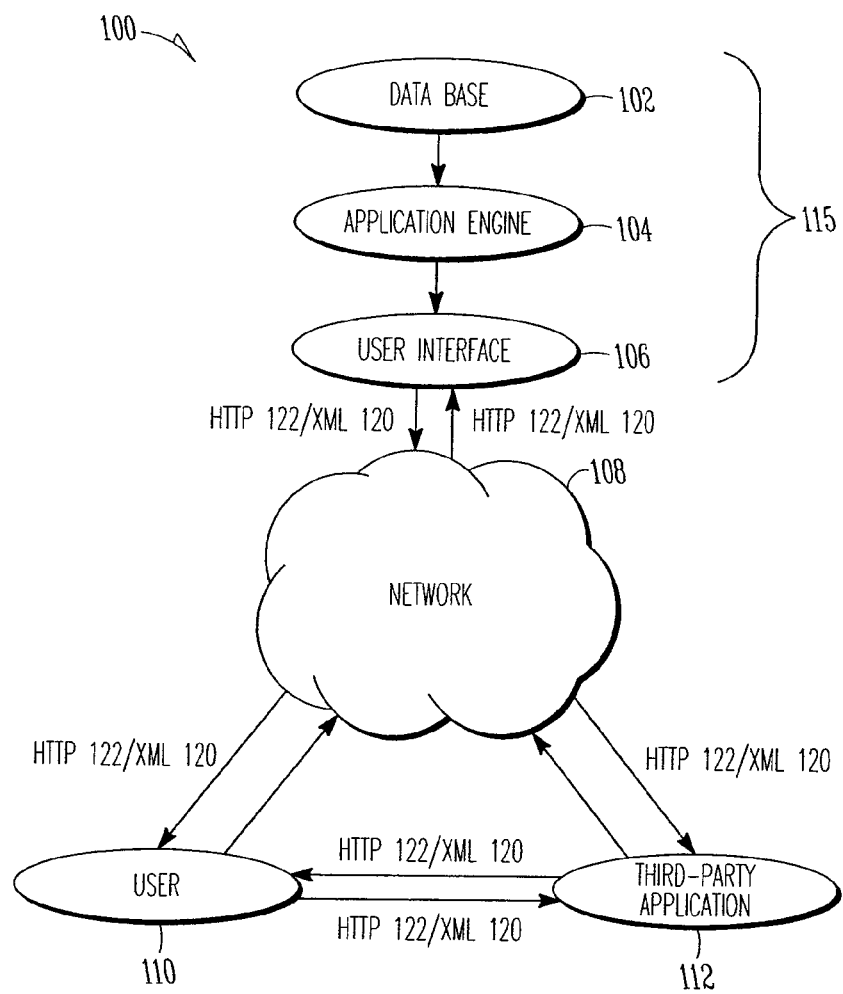
FIG. 1a is an exemplary prior art embodiment of a network-based publication system, a third party application, and the Hyper Text Transport Protocol and eXtensible Markup Language used by the facility and third party application.
Figure 1B:
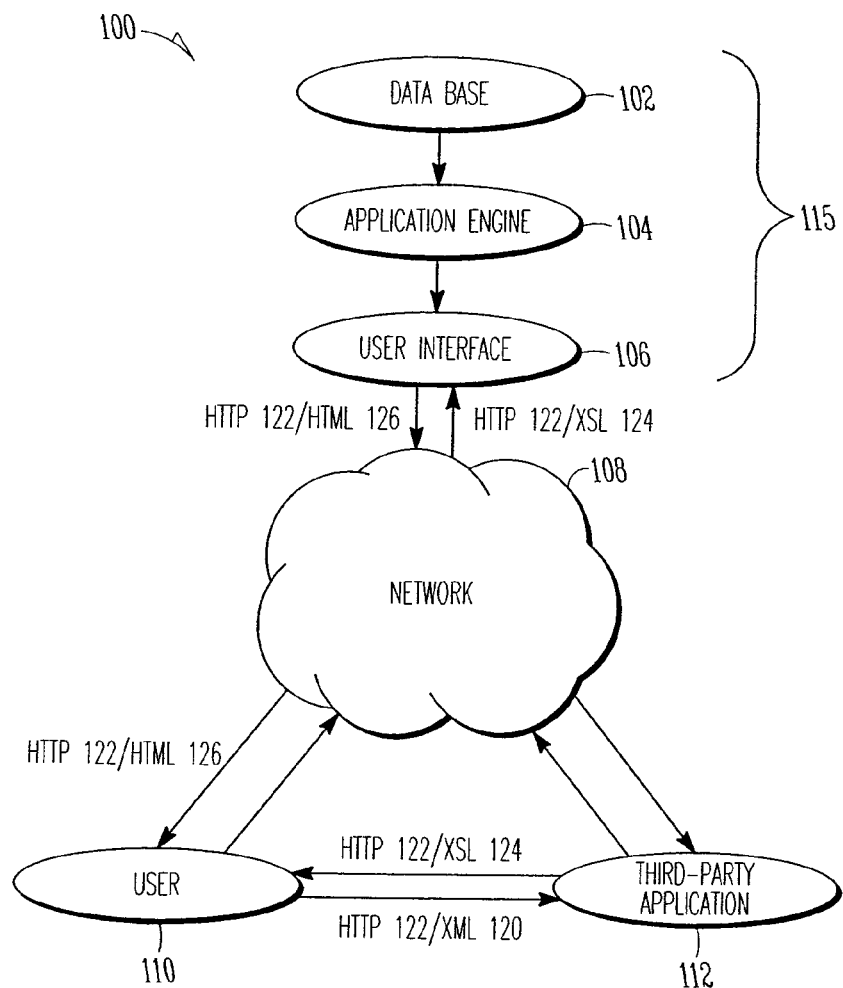
FIG. 1b is an exemplary prior art embodiment of a network-based publication system, a third party application, and the Hyper Text Transport Protocol and eXtensible Style Language used by the facility and third party application.
Figure 2:
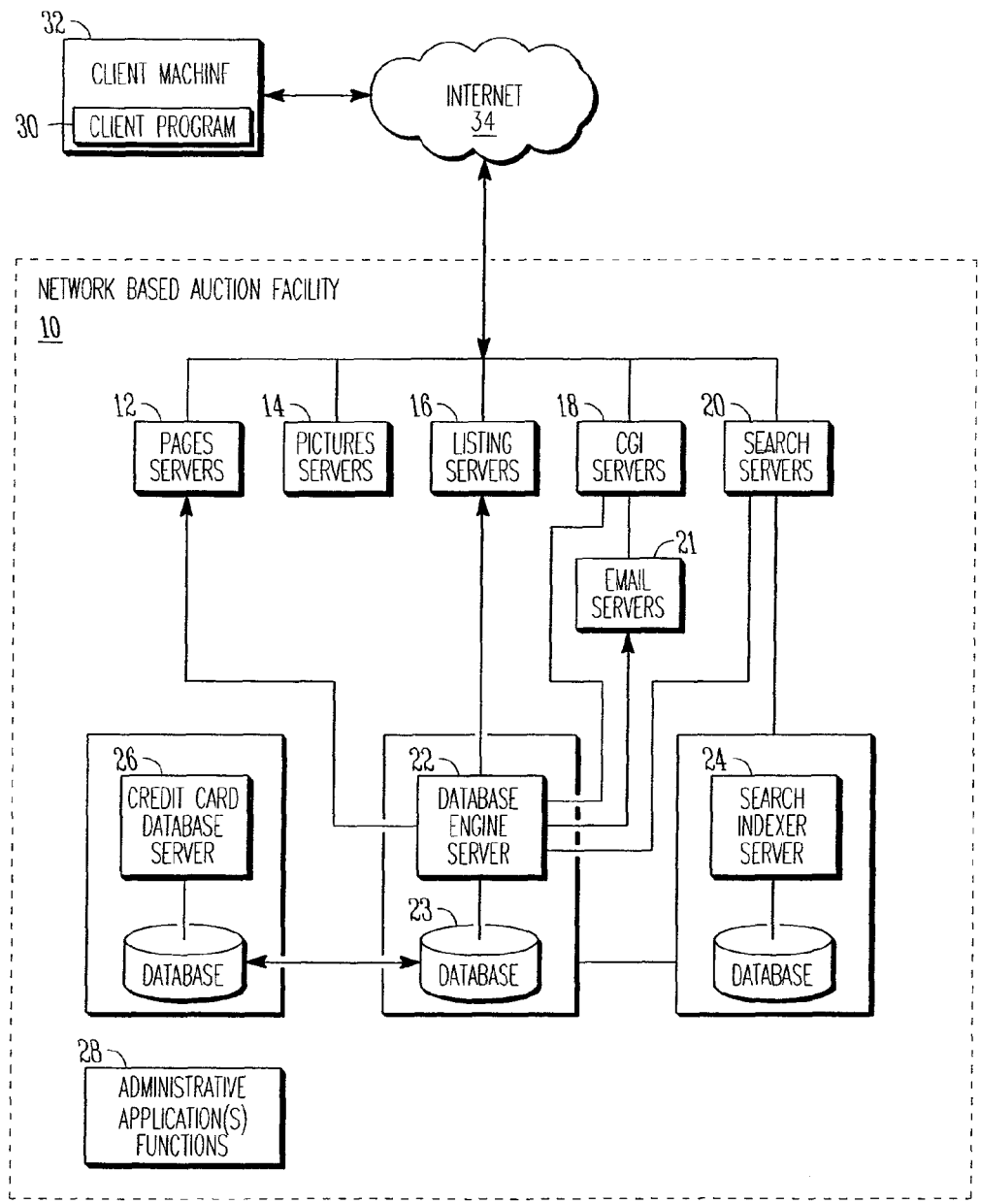
FIG. 2 is an exemplary block diagram of one embodiment of a network-based publication system.

FIG. 2 is a block diagram illustrating an exemplary network-based publication system 10. While an exemplary embodiment of the present invention is described within the context of an publication system, it will be appreciated by those skilled in the art that the invention will find application in many different types of computer-based, and network-based, commerce facilities.

The publication system 10 includes one or more of a number of types of front-end servers, namely page servers 12 that deliver web pages (e.g., markup language documents), picture servers 14 that dynamically deliver images to be displayed within Web pages, listing servers 16, Computer Graphic Interface (CGI) servers 18 that provide an intelligent interface to the back-end of system 10, and search servers 20 that handle search requests to the system 10. E-mail servers 21 provide, inter alia, automated e-mail communications to users of the system 10.

The back-end servers include a database engine server 22, a search index server 24 and a credit card database server 26, each of which maintains and facilitates access to a respective database, for example, database 23.

The Internet-based publication system 10 may be accessed by a client program 30, such as a browser (e.g., the Internet Explorer distributed by Microsoft Corp. of Redmond, Wash.) that executes on a client machine 32 and accesses the system 10 via a network such as, for example, the Internet 34. Other examples of networks that a client may utilize to access the publication system 10 include a wide area network (WAN), a local area network (LAN), a wireless network (e.g., a cellular network), or the Plain Old Telephone Service (POTS) network.

Database Structure

Figure 3:
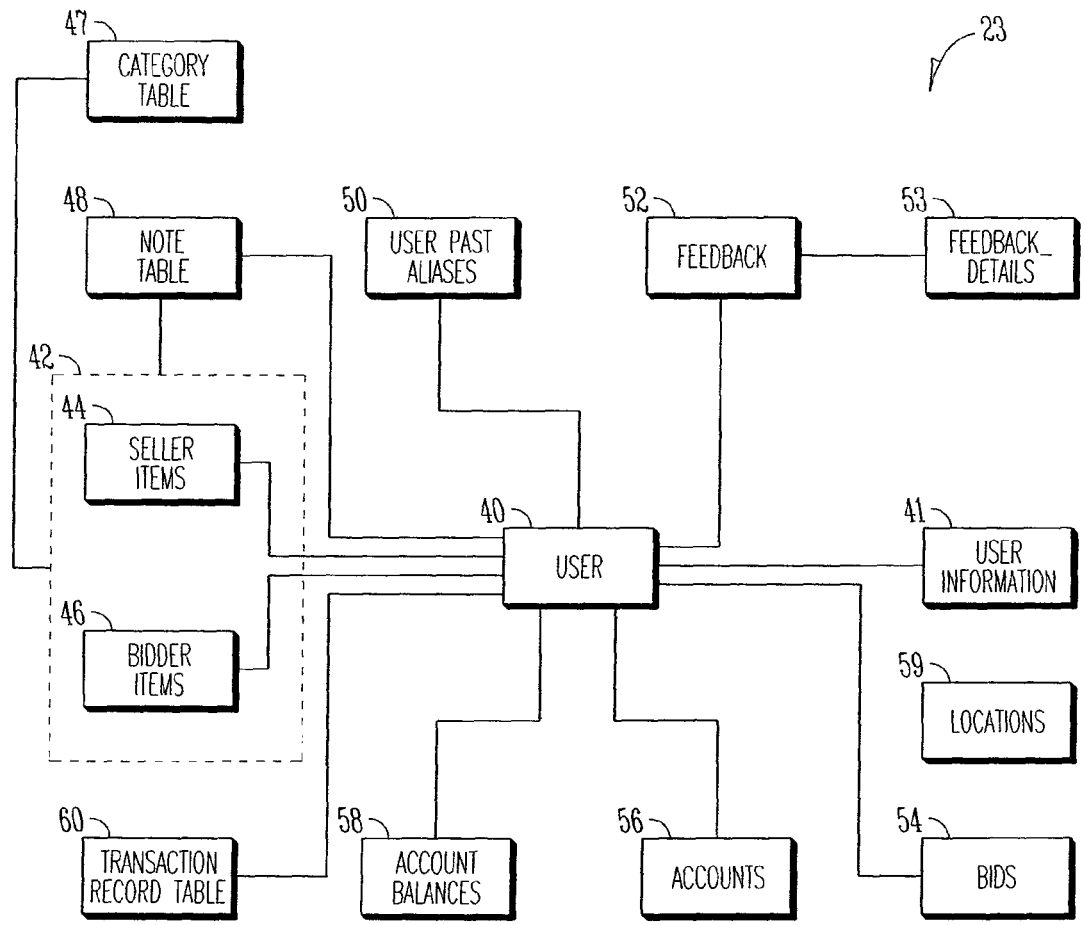
FIG. 3 illustrates an exemplary block diagram of one embodiment of a database maintained by a database engine server.

FIG. 3 is a database diagram illustrating an exemplary database 23, maintained by and accessed via the database engine server 22, which at least partially implements and supports the publication system 10. The database 23 may, in one embodiment, be implemented as a relational database, and includes a number of tables having entries, or records, that are linked by indices and keys. In an alternative embodiment, the database 23 may be implemented as a collection of objects in an object-oriented database.

Central to the database 23 is a user table 40, which contains a record for each user of the publication system 10. A user may operate as a seller, buyer, or both, with respect to the publication system 10. A user information table 41 is linked to the user table 40 and includes more detailed information about each user. The database 23 also includes item tables 42 that may be linked to the user table 40. Specifically, the tables 42 include a seller items table 44 and a bidder items table 46. A user record in the user table 40 may be linked to publication data relating to multiple items that are being, or have been, auctioned via the system 10, for example. A link indicates whether the user is a seller or a bidder (or buyer) with respect to items for which records exist within the item tables 42. The database 23 also includes a note table 48 populated with note records that may be linked to one or more item records within the item tables 42 and/or to one or more user records within the user table 40. Each note record within the table 48 may include, inter alia, a comment, description, history or other information pertaining to an item being auctioned via the publication system 10, or to a user of the publication system 10.

A number of other tables are also shown to be linked to the user table 40, namely a user past aliases table 50, a feedback table 52, a feedback details table 53, a bids table 54, an accounts table 56, an account balances table 58 and a transaction record table 60. In addition, the database 23 includes a location table 59 which stores valid demographic information that is used to verify registration information submitted by users during the registration process.

Figure 4:
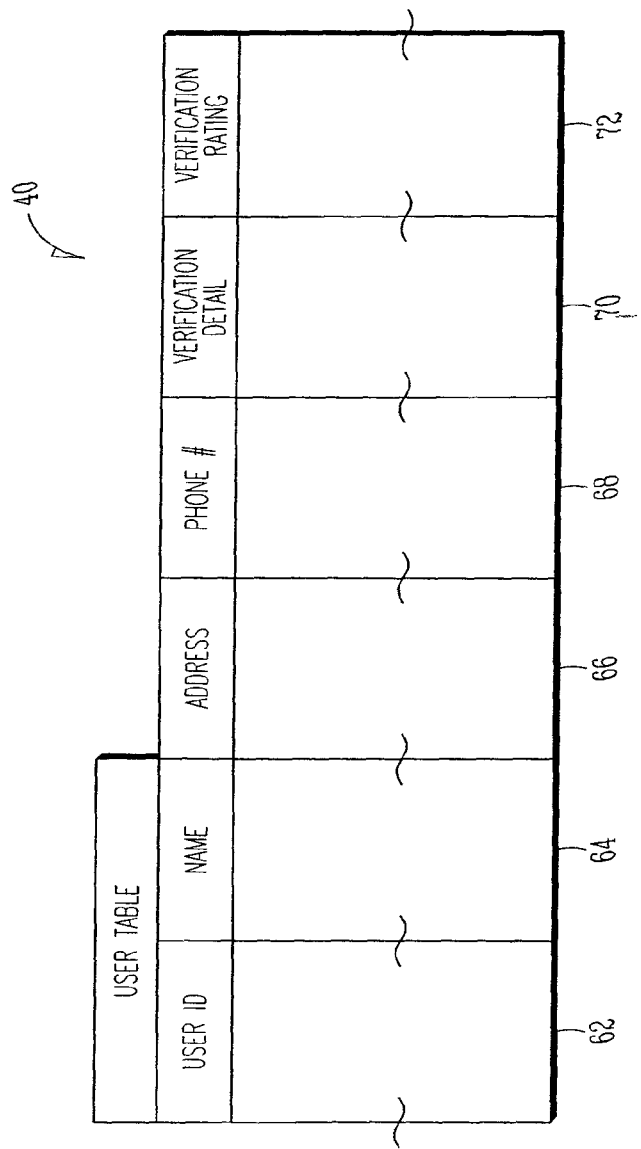
FIG. 4 illustrates an exemplary diagrammatic representation of one embodiment of a user table within the database of FIG. 3.

FIG. 4 is a diagrammatic representation of an exemplary embodiment of the user table 40 that is populated with records, or entries, for each user of the publication system 10. The table 40 includes a user identifier column 62 that stores a unique identifier for each user. A name column 64 stores a first name, a middle initial and a last name for each user. An address column 66 stores full address information for each user, e.g., a street name and number, city, zip code, state, etc. A phone number column 68 stores a home phone number for each user. It may be desirable to have each user verified, for example, through some identity checking process to verify that the user is who it is purporting to be prior to granting access to a particular user. Verification detail column 70 and verification rating column 72 may be included in the user table 40 to indicate details and rating of each individual's verification process.

It will be appreciated that any information other than that described above may populate the user table 40 without loss of generality.

FIG. 5 is an exemplary diagrammatic representation of an embodiment of the location table 59. The location table 59 stores a list of current zip codes and associated location information. In one embodiment, the data stored in the location table 59 is imported from a commercial database and is periodically completely re-populated with a new release of the commercial database. Alternatively, the data stored in the locations table 59 is obtained from various sources including various commercial databases and/or the publication system 10 itself. The table 59 includes a zip code column 80 that stores a list of current zip codes in the U.S. and abroad. Each zip code corresponds to valid city information stored in a city column 82. A flag stored in a column 98 indicates whether the city information stored in the column 82 is for a main city or an alias city. The zip code information stored in the column 80 is also correlated with area code information stored in an area code column 92 and with other location information stored in a state column 84, country name column 86, country code column 88, country column 90, time zone column 94, latitude column 96, and longitude column 97. A column 95 includes a flag indicating, for each entry, whether daylight savings time is adopted in this geographic area. A source column 99 stores a value indicating the source of the record, i.e., whether the record was imported from a certain commercial database, created by an administrator of the publication system 10, or was originated by other source.

It will be appreciated that other demographic information may also populate the location table 59.

Figure 6:
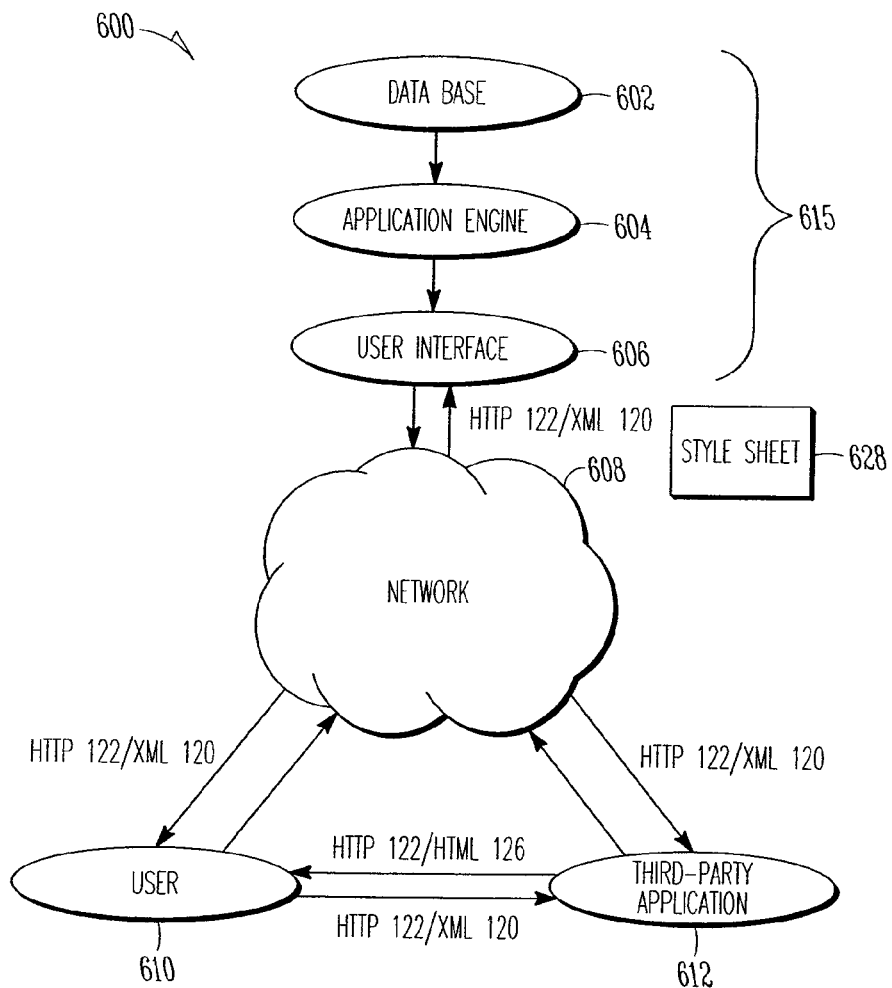
FIG. 6 illustrates an exemplary block diagram of an embodiment of a network-based publication system.

In an example embodiment, a network-based publication system 600/615 can be described as illustrated in FIG. 6. The database 602 stores all of the information (e.g., user records, item records, etc.) maintained by the publication system 600 as discussed above. In an embodiment, the database 602 includes a database 707 that contains client-uploaded presentation formats. A commerce engine 604 is further coupled to the database 602. The commerce engine 604 contains all of the business logic, for instance, how an auction will work if the publication system 600 is an auction. This includes rules such as how to calculate the highest bid, to set the minimum bid for a particular item, determine what fields are necessary and optional for a particular item, or in short, all of the logic of how to manage the auction. The commerce engine 604 functions based on program codes that are configured to access the information stored in the database 602. The codes can be written in any suitable programming language that can access the information stored in the database 602 for instance, in C++ language.

Continuing with the embodiment shown in FIG. 6, a user interface 606 is coupled to the commerce engine 604. It is the database 602, the commerce engine 604, and the user interface 606 that essentially make up the server side of the network-based publication system 615. The user interface 606 includes application programs that are run from the commerce engine 604 that provide a user interface for the publication system 615. For example, when a user 610 visits a web site belonging to the publication system 615, the user interacts with the user interface application programs included in the user interface 606 that essentially provide a browser with which the user may interact. That is, the user interface 106 is functioning as an application interface exposed to the third party (which behind the scenes does the transformation processing) and returns the response to the third party using an XSL style sheet specified in the request message. In one example, the browser presents a humanly readable interface for the user to interact with the publication system 615. Through the application programs, the user can interact with the commerce engine 604 and the database 602 to obtain or submit the desired information. After the data are extracted from the database 602, the data are presented to the user in the human readable format for interaction. One well known example of a data format that can be presented to the user for such interaction is the Hyper Text Markup Language (HTML). HTML defines the page layout, font, graphic elements as well as hyper links to other documents on the website of the publication system 600.

A user of the publication system 600 is typically connected to the Internet or other network 608 via any suitable method, for instance, through a conventional cable and a modem, wireless access modem and an antenna, etc. A user can also be a computer with programs to act on behalf of the actual user. Typically, the user is connected to the network 608 by issuing to the publication system 600 a HyperText Transport Protocol command 122 (HTTP). HTTP 122 is a communication protocol used to connect to servers on the WorldWideWeb, for instance, servers 12, 14, 16, and 20 of the publication system 10 in FIG. 2, or commerce engine 104 in FIG. 6. HTTP may also transmit HTML pages to browsers utilized by the user to access the publication system 600. In another embodiment, a Representational State Transfer (REST) Application Program Interface (API) may be used. As known to those of skill in the art, a REST API is a more succinct HTTP protocol that uses a subset of HTTP commands.

FIG. 6 in particular illustrates an embodiment in which a user or third party affiliate 610 of a network-based publication system 600 may upload a style sheet 628, e.g., an eXtensible Style Language (XSL) or a Cascading Style Sheet (CSS), to the database 707 in the network-based publication system 615, make a request to the network-based publication system (such as a request to do a search and return the search results to the network-based publication system), and receive back the search results in a readily displayable HTML document 126 (which contains therein statements/commands dictating the format of the document formatted from the style sheet 628 that was uploaded to the network-based publication system database 707).

The embodiment illustrated in FIG. 6 employs a two phase process. First, a user or third party affiliate 610 uploads a style sheet 628 to a database 707 in a network-based publication system 615. Second, sometime thereafter, the user or third party affiliate 610 makes a request to the network-based publication system, such as a request for information, and the network-based publication system 600 returns that information to the third party affiliate 610 in a form dictated by the style sheet. In another embodiment, several style sheets are uploaded to the network-based publication system 615, and the user 601 includes in the request a key to identify the style sheet that the user would like to invoke.

Figure 7:
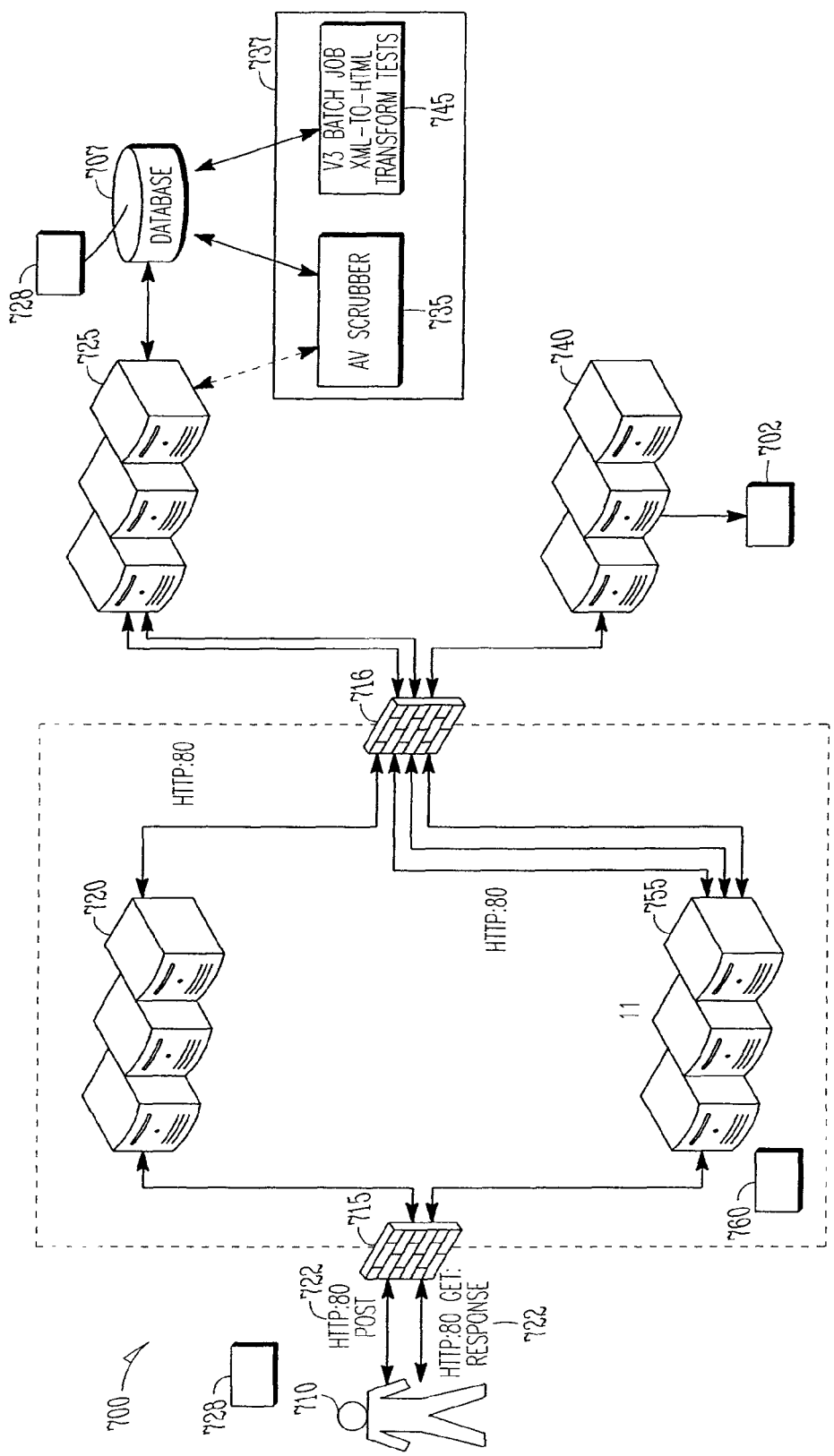
FIG. 7 illustrates another exemplary block diagram of an embodiment of a network-based publication system.

A more detailed illustration of the embodiment of FIG. 6 is illustrated in FIG. 7. In FIG. 7, a user or third party affiliate 710 of a network-based publication system 700 may upload to a database 707 in the network-based publication system 700 an XSL, CSS, or other style sheet 728. The style sheet 728 is transmitted in a request message over HTTP protocol, for example, an HTTP POST command. In an embodiment, the message 722 is first screened by a firewall 715. One purpose of the firewall 715 is to prevent viruses and other harmful files from gaining access to the network-based publication system 700, and in particular, the firewall 715 prevents the introduction of any harmful files via a third party affiliate's submission of a style sheet 728. After passing through the firewall 715, a processing unit 720 performs a first check on the style sheet 728. In an embodiment, this first check involves a simple syntactic validation of the XSL or other format presentation code, and a parsing and normalization of the format presentation code. The request 722 containing the style sheet 728 is transferred through firewall 716 to another internal processor 725. The processor 725 writes the style sheet 728 to the database 707, and marks the style sheet as inactive. The processor 725 further informs a scrubber process 735 that a new style sheet has been written to the database 707. The scrubber process 735 reads the style sheet 728, and scans it to determine if there are any viruses, malicious content, or other potentially harmful code (such as ActiveX script code, Java script code, attempts to access URLs or other internal resources, attempts to access XSLs from other untrusted sites, attempts to make external/outbound connections, or the presence of non-terminating recursive logic). In an embodiment, the system 700 checks the XSL files after scrubbing to verify that the scrubbing was successfully completed. If the scrubbing was successful, the database 707 is updated to indicate that the style sheet 728 is active. If the scrubbing process 735 did not successfully complete, the style sheet 728 remains inactive, and the system 700 notes the scrubbing failure. After the completion of the scrubber process 735, in an embodiment, a process 745 performs XSL to HTML transform tests on the style sheet 728 to determine if the XSL style sheet can successfully transform some test XML documents into other XML documents or HTML documents. A successful completion of these transform tests verifies that the style sheet 728 contains proper commands, code and syntax (either XSL, CCS, or some other format language) so that when the system 700 is called upon to transform a third party's search results from an XML format to an HTML format, there will be no errors in the conversion process. These transforms are further needed to check that it will not take an indefinite time period to execute the transformation of XML to HTML using the given XSL style sheet. Furthermore, these transform tests restrict style sheets so that they are executed within reasonable and configurable periods so as to minimize computational impact on an network-based publication system (e.g., making an E-commerce site unstable with respect to availability). In an embodiment, the AV Scrubber 735 and the process 735 are part of an extensible validation pipeline 737. In the extensible validation pipeline 737, validation processes can be added, deleted, activated, and deactivated as future requirements dictate.

Figure 8D:
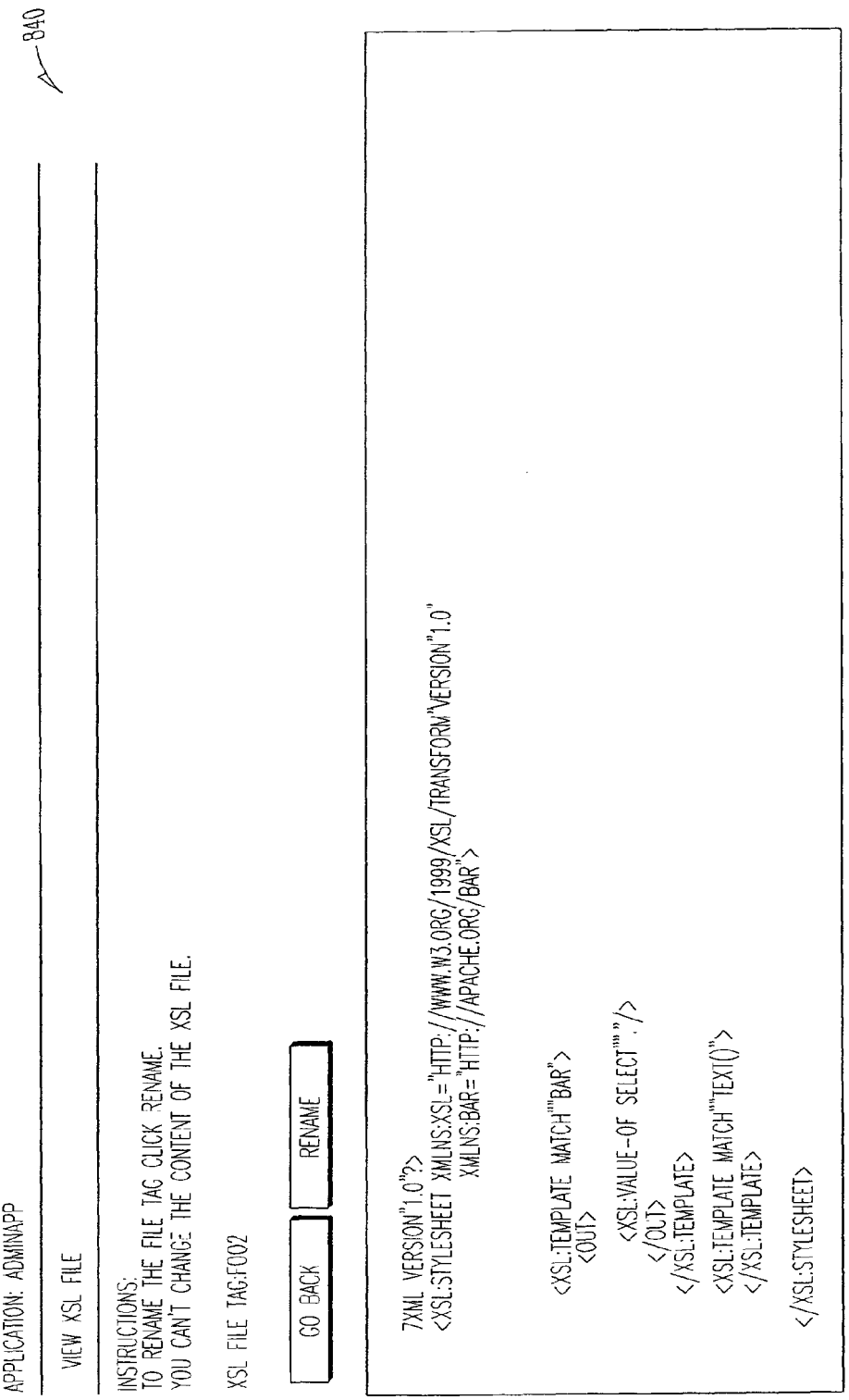

In an embodiment, the uploading of a style sheet 728 is implemented by the third party user affiliate 710 through a user interface website maintained by the network-based publication system 700. FIGS. 8A-8E illustrate examples of web pages that are associated with such an interface. FIG. 8A illustrates a page 800 that lists several applications 805 that may be accessed by a third party user. FIG. 8B illustrates a page 810 that lists the style sheets 815 that are associated with a particular application of a third party affiliate user 710. In this embodiment, the web page displays an identifier 816 for each style sheet, a file name 818 for each style sheet, the date and time 817 when that style sheet was uploaded into the system's database 707, and whether the style sheet is active at 819. In another embodiment, a transformation timeout history is maintained, and the transformation timeout history keeps a record of the times that a particular style sheet timed out in its transformation from an XML document to an HTML document. A history of timeouts for a particular style sheet indicates a problem with that style sheet. FIG. 8C illustrates a page 830 that permits a user to upload a new style sheet, FIG. 8D illustrates a page 840 that permits a user to view a style sheet file, and FIG. 8E illustrates a page 850 that permits a user to rename a style sheet file. In an embodiment, for security purposes, a user 710 is not permitted to edit style sheets. If a user would like to change a style sheet, the user must first delete the style sheet, and then replace it by adding a new version of that style sheet. In an embodiment, the facility 700 may place an upper limit on the number of style sheets that a third party affiliate is allowed to upload to the database 707.

After the upload of a style sheet 728 into the database 707 in the network-based publication system 700, and the indication that the style sheet is active and has passed the transform tests, the style sheet 728 is available to the facility 700 for the facility to format data into an HTML document (or another XML document) before such data is transferred from the network-based publication system 700 to the third party affiliate 710. In an embodiment, this transmission of data from the network-based publication system 700 can be in response to a request for information by the third party affiliate. In another embodiment, data can be sent by the network-based publication system 700 to a third party affiliate 710 independent of any specific request by a third party user.

Specifically, referring again to the embodiment of FIG. 7, a third party affiliate 710 submits a request for information to the network-based publication system 700. In an embodiment, this request includes a command to the publication system 700, such as an HTTP GET command and search parameters to retrieve data, and a file id to identify a style sheet 728 in the database 707. The request 722 passes through the firewall 715, through processor 720, through firewall 716, and to processor 725. Processor 725 reads the request 722, parses out the command, and signals internal processor 740 to retrieve the information from its databases 702 that meet the criteria specified in the request 722. In an embodiment, this retrieved data is formatted into an XML document. Processor 725 then transmits the search results to processor 755 which, in an embodiment, includes a formatting module. Processor 725 further retrieves the XSL style sheet 728 identified in the original request 722 for this third party affiliate from the database 707, and transmits that style sheet 728 to processor 755. In another embodiment, recently used style sheets are maintained in a cache memory, and processor 725 first checks cache memory to determine if the needed style sheet is in cache memory. The formatting module in processor 755 uses the style sheet 728 to transform the data into an HTML document 760. In an embodiment, processor 755 creates a new execution process that performs the actual transformation. The processor 755 monitors this transformation process, and if the time that it takes to transform this data exceeds a threshold (e.g., 3000 milliseconds), processor 755 terminates the transformation process and returns an error message to the client. Furthermore, if the client continues to send requests using the same XSL file id, which results in consecutive transformations timeouts, that XSL instance is disabled and made inactive. In this manner, the network-based publication system 700 is able to prevent at run time system taxing events caused by the transformation such as infinite loops and/or other malicious events.

The HTML document 760 is then transmitted back to the third party affiliate 710, and the third party affiliate's system renders the HTML document.

Computer Architecture

Figure 9:
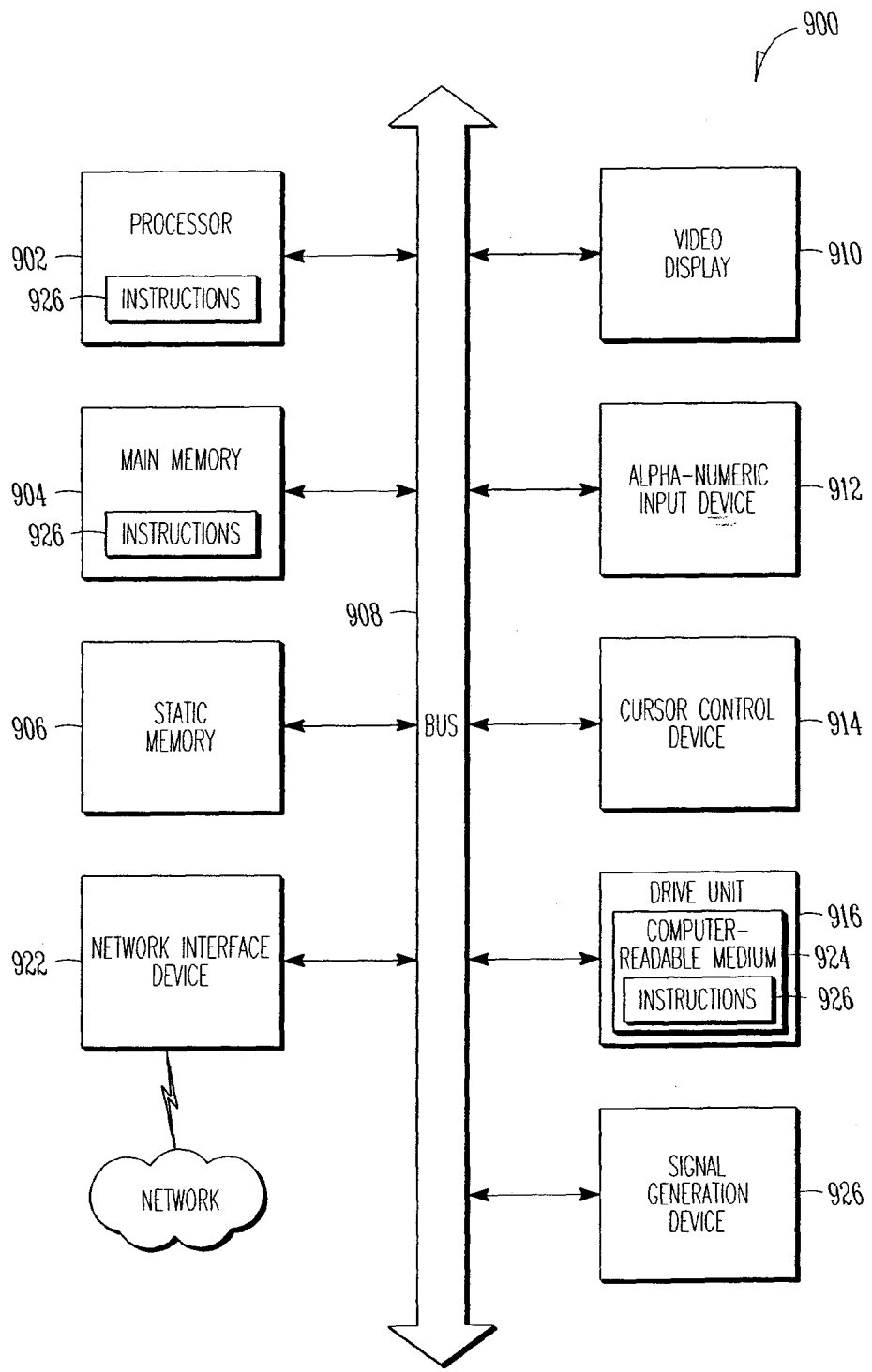
FIG. 9 illustrates a block diagram of an exemplary embodiment of a computer system that can implement embodiments of the present invention.

FIG. 9 shows a diagrammatic representation of machine in the exemplary form of a computer system 900 within which a set of instructions, for causing the machine to perform any one of the methodologies discussed above, may be executed. In the alternative embodiment, the machine may comprise a network router, a network switch, a network bridge, Personal Digital Assistant (PDA), a cellular telephone, a web appliance or any machine capable of executing a sequence of instructions that specify actions to be taken by the machine.

The computer system 900 includes a processor 902, a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alpha-numeric input device 912 (e.g., a keyboard), a cursor control device 914 (e.g., a mouse), a disk drive unit 916, a signal generation device 920 (e.g., a speaker) and a network interface device 922.

The disk drive unit 916 includes a computer-readable medium 924 on which is stored a set of instructions (i.e., software) 926 embodying any one, or all, of the methodologies described above. The software 926 is also shown to reside, completely or at least partially, within the main memory 904 and/or within the processor 902. The software 926 may further be transmitted or received via the network interface device 922. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Thus, a method and apparatus for detecting suspicious transactions occurring over a network-based transaction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

We claim:

1. A method comprising:
receiving from a user a presentation format to be stored at a database on a network-based publication system;
storing the presentation format in the database;
using the presentation format to transform a test document;
verifying that a transformation of the test document is performed within a finite time period;
marking the presentation format as active as an indication that the test document is transformed by the presentation format within the finite time period;
receiving from the user a request to said network-based publication system; and
formatting a response to said request on the network-based publication system in a readily displayable format using said received presentation format based on the marking of the presentation format as active as the indication that the test document is transformed by the presentation format within the finite time period.

2. The method of claim 1, wherein said presentation format is selected from the group consisting of an eXtensible Style Language (XSL) document and a Cascading Style Sheet (CSS) document.

3. The method of claim 1, wherein said network-based publication system is one or more of a network based commerce system and an online auction.

4. The method of claim 1, wherein said request is received at said network-based publication system via an eXtensible Markup Language (XML) document over Hyper Text Transmission Protocol.

5. The method of claim 1, wherein said network-based publication system checks a syntax of said presentation format.

6. The method of claim 1, wherein said presentation format comprises an eXtensible Style Language (XSL) document, and said test documents comprise eXtensible Markup Language (XML) documents.

7. The method of claim 1, wherein
said network-based publication system creates a process to transform said request into said response using said active presentation format;
said network-based publication system sets a threshold for said process; and
said network-based publication system terminates said process if said process fails to complete said transformation within said threshold.

8. The method of claim 1, wherein said request comprises a command to access information on said network-based publication system and a key to identify said presentation format for said response.

9. The method of claim 1, wherein the readily displayable format comprises a hyper text markup language (HTML) document.

10. The method of claim 1, wherein the test document comprises an XML document and the XML document is transformed into another XML document or an HTML document.

11. The method of claim 1, wherein a duration of time that it takes to transform the test document using the presentation format is examined to verify that the transformation does not take an indefinite time period.

12. The method of claim 1, comprising maintaining a transformation timeout history for a presentation format.

13. A system comprising:
a memory;
a processor coupled to said memory; and
instructions for execution in said processor to implement a network-based publication system;
said network-based publication system comprises a database of style sheets uploaded from a user of the network-based publication system;
said processor is configured to test said style sheets against a test document;
said processor is configured to verify that the test is performed within a finite time period;
said processor is configured to mark the style sheets as active as an indication that the test is successful and performed within the finite time period;
said processor is configured to receive from the user a request; and
said processor is configured to format a response to said request using one or more active style sheets marked as active as the indication that the test is successful and performed within the finite time period.

14. The system of claim 13, comprising a first user interface for uploading said style sheets to said network-based publication system.

15. The system of claim 14, comprising a second user interface to receive a request from a user, said request comprising a command to access information in said network-based publication system and a key to identify said style sheets in said database.

16. The system of claim 13, wherein said style sheets comprise eXtensible Style Language (XSL) documents, and said test document comprises eXtensible Markup Language (XML) documents.

17. The system of claim 15, wherein said second user interface comprises a Representational State Transfer Application Program Interface.

18. The system of claim 13, wherein each of said style sheets comprises an identifier, a creation timestamp, a last accessed timestamp, a deleted timestamp, and a transformation timeout history.

19. The system of claim 13, wherein said processor is configured to:
verify a syntax of said style sheets; and
verify an absence of malicious code in said style sheets.

20. A machine readable medium having no transitory signals and comprising instructions, that when executed by one or more processors of a machine, cause the machine to perform operations comprising:
receiving from a user a presentation format to be stored at a database on a network-based publication system;
storing the presentation format in the database;
using the presentation format to transform a test document;
verifying that a transformation of the test document is performed within a finite time period;
marking the presentation format as active as an indication that the test document is transformed by the presentation format within the finite time period;
receiving from the user a request to said network-based publication system; and
formatting a response to said request using said active presentation format marked as active as the indication that the test document is transformed by the presentation format within the finite time period.

21. A network-based system comprising:
an interface configured to receive a user uploaded presentation format to be stored at a database on a network-based publication system, and to receive from the user a request to said network-based publication system;
a processor configured to use the presentation format to transform a test document;
a processor configured to verify that a transformation of the test document is performed within a finite time period;
a processor configured to mark the presentation format as active as an indication that the test document is transformed by the presentation format within the finite time period; and
a formatting processor to format a response to said request using the active presentation format marked as active as the indication that the test document is transformed by the presentation format within the finite time period.

22. The network-based system of claim 21, wherein said network-based system comprises an online auction.

23. The network-based system of claim 21, wherein said network-based system checks the syntax of said presentation format.

24. The network-based system of claim 21, wherein said network-based system checks said presentation format for malicious code.

25. The network-based system of claim 21, wherein
said network-based system creates a process to transform said request into said response using said presentation format;
said network-based system sets a threshold for said process; and
said network-based system terminates said process if said process fails to complete said transformation within said threshold.

26. The network-based system of claim 21, wherein said request comprises a command to access information on said network-based system and a key to identify said presentation format for said response.

27. A network-based system comprising:
first means for receiving a user uploaded presentation format to be stored at a database on a network-based publication system, and for receiving from the user a request to said network-based publication system;
second means for using the presentation format to transform a test document;
third means for verifying that a transformation of the test document is performed within a finite time period;
fourth means for marking the presentation format as active as an indication that the test document is transformed by the presentation format within the finite time period; and
fifth means for formatting a response to said request using said active presentation format marked as active as the indication that the test document is transformed by the presentation format within the finite time period.

28. A system comprising a computer processor configured to:
receive from a user a presentation format to be stored at a database on a network-based publication system;
store the presentation format in the database;
use the presentation format to transform a test document;
verify that a transformation of the test document is performed within a finite time period;
mark the presentation format as active as an indication that the test document is transformed by the presentation format within the finite time period;
receive from the user a request to said network-based publication system; and
format a response to said request on the network-based publication system in a readily displayable format using said received presentation format based on the marking of the presentation format as active as the indication that the test document is transformed by the presentation format within the finite time period.

29. A system comprising:
a memory;
a processor coupled to said memory; and
instructions for execution in said processor to implement a network-based commerce system;
said network-based commerce system comprises a database of style sheets uploaded from a user of the network-based commerce system; and
said processor is configured to test the style sheets against a test document, verify that the test is performed within a finite time period, mark the style sheets as active as an indication that the test is successful and performed within the finite time period, and format a response to a request using one or more style sheets identified in the request.

30. A method comprising:
receiving from a user a presentation format to be stored at a database on a network-based commerce system;
using the presentation format to transform a test document;
verifying that a transformation of the test document is performed within a finite time period;
marking the presentation format as active as an indication that the test document is transformed by the presentation format within the finite time period;
receiving from the user a request that identifies the presentation format to said network-based commerce system; and
formatting a response to said request using said presentation format received from the user and identified in the request.

31. The method of claim 30, wherein said network-based publication system comprises one or more of a network based commerce system and an online auction.

32. The method of claim 30, wherein said network-based commerce system checks a syntax of said presentation format.

33. The method of claim 30, wherein said network-based commerce system checks said presentation format for malicious code.

34. The method of claim 30, wherein said network-based commerce system tests said presentation format against a test data document.

35. The method of claim 30, wherein
said network-based commerce system creates a process to transform said request into said response using said presentation format;
said network-based commerce system sets a threshold for said process; and
said network-based commerce system terminates said process if said process fails to complete said transformation within said threshold.

* * * * *